(12) United States Patent
Bradley et al.

(10) Patent No.: US 11,995,724 B2
(45) Date of Patent: May 28, 2024

(54) REDUCING DRIVING RISK

(71) Applicant: Cambridge Mobile Telematics Inc., Cambridge, MA (US)

(72) Inventors: William Bradley, Arlington, MA (US); Samuel Ross Madden, Newton, MA (US); Gregory David Padowski, Quincy, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

(21) Appl. No.: 16/835,678

(22) Filed: Mar. 31, 2020

(65) Prior Publication Data
US 2021/0304314 A1 Sep. 30, 2021

(51) Int. Cl.
G06Q 40/08 (2012.01)

(52) U.S. Cl.
CPC .................... G06Q 40/08 (2013.01)

(58) Field of Classification Search
CPC .................................................. G06Q 40/08
USPC .......................................................... 705/4
See application file for complete search history.

(56) References Cited

U.S. PATENT DOCUMENTS

| | | | |
|---|---|---|---|
| 5,287,773 A | 2/1994 | Nakawaki et al. | |
| 6,714,851 B2 | 3/2004 | Hrovat et al. | |
| 8,457,880 B1 | 6/2013 | Malalur et al. | |
| 9,228,836 B2 | 1/2016 | Girod et al. | |
| 10,115,164 B1 * | 10/2018 | Binion et al. | G06Q 40/08 |
| 10,242,274 B1 * | 3/2019 | Chan et al. | G06K 9/00 |
| 10,440,451 B2 | 10/2019 | Balakrishnan et al. | |
| 11,068,730 B1 * | 7/2021 | Chan et al. | G06K 9/00 |
| 2014/0320946 A1 | 8/2014 | Tomkins et al. | |
| 2015/0019266 A1 * | 1/2015 | Stempora | G06Q 40/08 |
| 2015/0025917 A1 * | 1/2015 | Stempora | G06Q 40/08 |
| 2017/0109949 A1 * | 4/2017 | Blumer et al. | G07C 5/08 |
| 2017/0241791 A1 * | 8/2017 | Madigan et al. | G01C 21/34 |
| 2018/0053415 A1 * | 2/2018 | Krunic et al. | G08G 1/0967 |
| 2018/0144408 A1 * | 5/2018 | Zentler | G06Q 40/08 |
| 2019/0102840 A1 * | 4/2019 | Perl et al. | G06Q 40/08 |
| 2019/0221023 A1 | 7/2019 | Kogan et al. | |
| 2020/0008028 A1 * | 1/2020 | Yang | H04W 4/48 |
| 2020/0175786 A1 * | 6/2020 | Bongers et al. | G07C 5/00 |
| 2021/0164792 A1 * | 6/2021 | Pal et al. | G01C 21/34 |

(Continued)

FOREIGN PATENT DOCUMENTS

| | | | | |
|---|---|---|---|---|
| DE | 102008002541 A1 * | 12/2009 | | G08B 21/02 |
| WO | WO 2018053175 | 3/2018 | | |

(Continued)

OTHER PUBLICATIONS

Kenji Hagta et al., The Effect of Sun Glare on Traffic Accidents in Chiba Prefecture, Japan, (2014) Asian Transport Studies, vol. 3, Issue 2, 205-219 (Year: 2014).*

(Continued)

Primary Examiner — Scott C Anderson
Assistant Examiner — George N. Proios
(74) Attorney, Agent, or Firm — Fish & Richardson P.C.

(57) ABSTRACT

Among other things, instructions stored in a tangible storage medium are executable by a processor to receive data representing an attitude of a vehicle being driven relative to a frame of reference and process the received attitude data to determine a risk factor in the driving of the vehicle.

22 Claims, 8 Drawing Sheets

(56) References Cited

U.S. PATENT DOCUMENTS

2021/0334904 A1* 10/2021 Kim ................. G06Q 40/08
2022/0319354 A1* 10/2022 Chung et al. ......... B60W 40/09

FOREIGN PATENT DOCUMENTS

WO   WO2018170883   9/2018
WO   WO 2019048034  3/2019

OTHER PUBLICATIONS

Kenji Hagita et al., The Effect of Sun Glare on Traffic Accidents in Chiba Prefecture, Japan, (2014) Asian Transport Studies, vol. 3, Issue 2, 205-219 (Year: 2014).*
Hagita et al., "The Effect of Sun Glare on Traffic Accidents in Chiba Prefecture, Japan", Asian Transport Studies, 2014, 3(2):205-219.
Redelmeier et al., "The full moon and motorcycle related mortality: population based double control study", bmj, 2017, p. 1-7.
PCT International Search Report and Written Opinion in International Appln. No. PCT/US2021/24637, dated Jun. 8, 2021, 13 pages.
European Search Report in European Appln. No. 21778842.1, dated Dec. 21, 2023, 11 pages.

* cited by examiner

REDUCING DRIVING RISK

BACKGROUND

This description relates to reducing driving risk.

A variety of driving and environmental risk factors can contribute to and be predictors of the risks of a vehicle being involved in a traffic accident, i.e., driving risk. Predicting, assessing, and reducing such risks to safe driving are of interest to a range of parties. Companies that insure against damage to a vehicle being driven under the influence of such risk factors, for example, are interested in assessing the risk of unsafe driving behavior so they can price policies correctly.

SUMMARY

In general, in an aspect, instructions stored in a tangible storage medium are executable by a processor to receive data representing an attitude of a vehicle being driven relative to a frame of reference and process the received attitude data to determine a risk factor in the driving of the vehicle.

Implementations may include one or a combination of two or more of the following features. The risk factor includes sun glare. The risk factor includes a current sun glare. The risk factor includes a future sun glare. The risk factor includes pitch or roll of the vehicle. The risk factor includes road pitch. The instructions are executable by the processor also to receive data representing a location of the vehicle and to process the location data to determine the risk factor. The instructions are executable by the processor also to receive data representing a time of day or a day of the year. The attitude data represents a current attitude of the vehicle. The attitude data represents a future attitude of the vehicle. The attitude data represents a roll or a pitch of the vehicle. The instructions are executable by the processor to predict a route to be taken by the vehicle. The instructions are executable by the processor to receive data representing prior routes taken by the vehicle. The instructions are executable by the processor to process the risk factor to determine a driving risk. The instructions are executable by the processor to send the attitude data or the risk factor or a corresponding driving risk to a server. The processor is part of a mobile device. The processor is part of a server. The instructions are executable by the processor to score the risk factor. The instructions are executable by the processor to receive data indicative of sun glare, and process the received sun glare data to determine a risk factor in the driving of the vehicle. The sun glare data includes weather data. The sun glare data includes data about a location of the sun. The risk factor includes a length of time during which a driver of the vehicle is subjected to sun glare. The instructions are executable by the processor to identify routes reducing the risk factor. The instructions are executable by the processor to identify times of departure reducing the risk factor. The instructions are executable by the processor to predict a timing and route of a likely future trip of the vehicle and to suggest one or more alternate routes or times of travel to reduce the risk factor. An insurance premium cost savings associated with the one or more alternate routes of the times of travel is displayed to a user. The instructions are executable by the processor to determine an effect of a configuration of a windshield of the vehicle on the risk factor. The instructions are executable by the processor to suggest one or more alternate routes or times of travel to reduce a risk factor associated with a dangerous road situation. The dangerous road situation includes a presence of pedestrians. Estimated driving risks associated with the determined risk factor are reported two insurance carrier In general, in an aspect, instructions stored in the tangible storage medium are executable by a processor to receive data indicative of a risk factor associated with an attitude of a vehicle to be driven relative to a frame of reference, and determine a route for the vehicle that reduces a driving risk associated with the risk factor.

Implementations may include one or a combination of two or more the following features. The determining of the route includes determining an expected sun glare risk of the route. The determining of the route includes determining an expected road pitch or roll risk of the route. The determining of the route includes determining an expected risk factor associated with the attitude and determining a dangerous driving situation associated with the route. The dangerous driving situation includes a presence of pedestrians on the route.

In general, in an aspect, instructions stored in the tangible storage medium are executable by a processor to predict a route along which a vehicle will be driven at a future time. A risk factor is determined associated with an attitude of the vehicle in driving along the route. The risk factor corresponds to a magnitude of a driving risk, and at least one alternative route is generated for the vehicle that has a smaller magnitude of the driving risk.

Implementations may include one or a combination of two or more of the following features. The generating of at least one alternative route includes determining an expected sun glare risk of the alternative route. The generating of at least one alternative route includes determining an expected road pitch or roll of the route. The generating of at least one alternative route includes determining an expected risk factor associated with the attitude and determining a dangerous driving situation associated with the alternative route. The dangerous driving situation includes a presence of pedestrians on the alternative route.

These and other aspects, features, and implementations can be expressed as methods, apparatus, systems, components, program products, methods of doing business, means or steps for performing a function, and in other ways.

Other features, objects, and advantages of the disclosure will be apparent from the description and drawings, and from the claims.

DESCRIPTION

OVERVIEW

Figure 1:
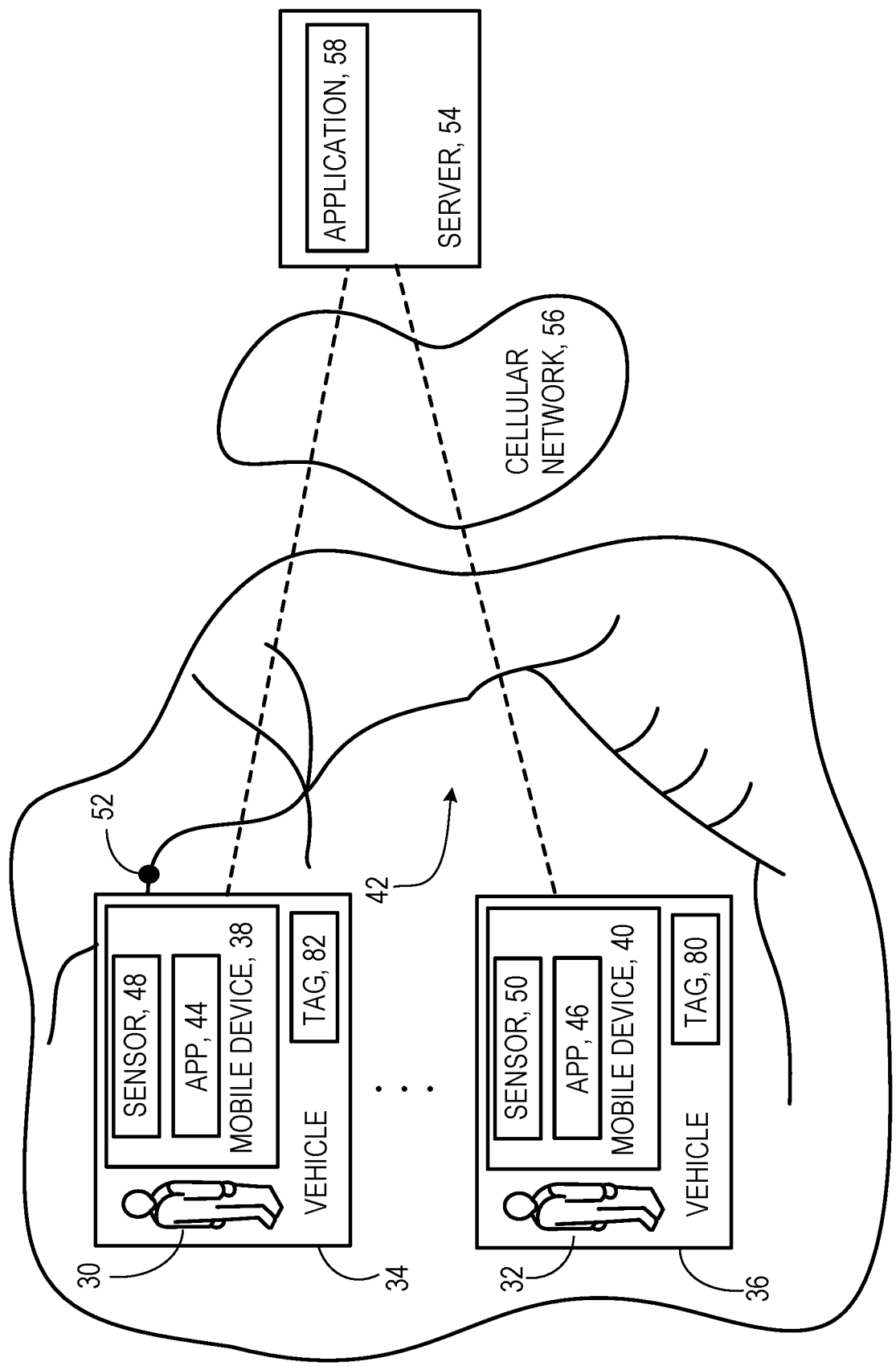
FIGS. 1 through 3 are block diagrams.

Mobile telematics data, for example, data about motion of vehicles and other parameters associated with driving, can be useful for identifying, assessing, and reporting driving and environmental risk factors and making predictions or evaluations of driving risks. Mobile telematics systems can use smart phone applications ("apps"), OBD II devices, affixed "black box" hardware, and other devices, or combinations of them, to collect mobile telematics data. These devices uses sensors to measure raw motion features, such as time, position, speed, attitude, and heading. Based on such measurements, among other data, it is possible to derive risk factors.

For example, a risk factor of "unsafe speeding" cannot be measured directly. Instead, it is characterized by raw motion data such as a measured speed, which is then interpreted as a high speed relative to a speed limit on a particular road segment being traversed. Thus, a combined knowledge of raw motion data (in this example, speed, position, a road network) and a legal speed limit might be needed to determine a risk factor. Driving risks, in turn, can be evaluated and predicted based on one or more such risk factors identified at a given time or over a period of time.

Among other risk factors, drivers have difficulty driving with the sun in their eyes. When the sun is near the horizon and a driver is heading towards the sun, the likelihood of a traffic accident (an example of a driving risk) is substantially elevated. This effect is well known and referred to by various names like sun glare, sun blindness, disability glare, veiling glare, sun block, or sun dazzle. An examination of the danger posed by sun glare can be found in Kenji Hagita and Kenji Mori, "The effect of sun glare on traffic accidents in Chiba Prefecture, Japan," Asian transport studies 3.2 (2014): 205-219.

An amount of time during which a driver suffers from sun glare is a risk factor that is a useful predictor of driving risk. In addition to being a predictor of driving risk, information about sun glare can be useful in aiding a driver to engage in safe driving behavior. For example, a driver may wish to avoid sun glare, but the best route for avoiding or reducing glare changes with the direction of the sun, the timing of the trip during the day, the season of the year, and the route taken. The technology that we describe here can provide a simple reliable method for a driver to learn alternate routes that respect his travel preferences (for example, time of travel and an intended destination) while avoiding or reducing the effect of sun glare.

Mobile telematics data can include, among other things, time, position, attitude, speed, acceleration, and heading of a vehicle being driven, at a given moment, at successive moments, or over a period of time. Coupled with weather data, map data, sun position data, and other data, the mobile telematics data enables a determination of how much time a driver has been subjected to, is being subjected to, or will be subjected to sun glare during one or more trips at one or more times along one or more routes. Among other things, the mobile telematics data—in some cases supplemented by historical driving data about trips taken by the same driver or one or more other drivers—can enable alternate routes or times of departure to be suggested to reduce the risk.

In addition to sun glare, another environmental or driving risk factor is the degree of pitch of a vehicle at a given time and over a period of time while being driven. By recording and analyzing when the vehicle is traveling uphill, downhill, or on a level surface, the pitch risk factor can be accurately assessed and used in predicting whether the driver of the vehicle will get into an accident (i.e., be vulnerable to a driving risk).

Systems for measuring the pitch of a vehicle include the ones described in "Method for road grade/vehicle pitch estimation," U.S. Pat. No. 6,714,851. Systems for controlling a vehicle based on road pitch include the ones described in "Apparatus for controlling engine brake force during vehicle running on downhill with released accelerator," U.S. Pat. No. 5,287,773. Systems for measuring car behavior and risk factors (such as acceleration, speeding or distracted driving), recording the information, and uploading it to a central server, include the ones described in "Inference of vehicular trajectory characteristics with personal mobile devices," U.S. Pat. No. 9,228,836. Each of these patents is incorporated here by reference in its entirety.

Here we describe technology for processing mobile telematics data to derive driving and environmental risk factors and to determine driving risks of those factors.

Technology Platform

As shown in FIG. 1, in some implementations of the technology that we describe here, one or more drivers 30, 32 of vehicles 34, 36 carry smart phones or other mobile devices 38, 40 when they drive the vehicles on the road network 42. Each of the mobile devices has installed and can run one or more native apps 44, 46 receiving mobile telematics data from one or more sensors 48, 50 of the mobile devices. In some implementations, a tag 80, 82 can be affixed in or otherwise placed in the vehicle to collect mobile telematics data and send it to or through the mobile device 38, 40. We sometimes use the term "mobile device" to refer also to such a tag. The sensors of the mobile device or of the tag can detect, measure, and report a variety of current mobile telematics data to the apps including a location 52 of the vehicle, a current time, a speed of the vehicle, an attitude (e.g., an orientation such as pitch, yaw, and roll) of the mobile device that relates to an attitude of the vehicle, and a current acceleration or deceleration of the vehicle, among other things. Historical mobile telematics data can also be stored on the tag or on the mobile device. The apps running on each of the mobile devices can use wireless communication components of the mobile devices to communicate the mobile telematics data (from the sensors of the mobile devices or from the sensors of the tags) to a central server 54 through the cellular network 56.

Figure 2:
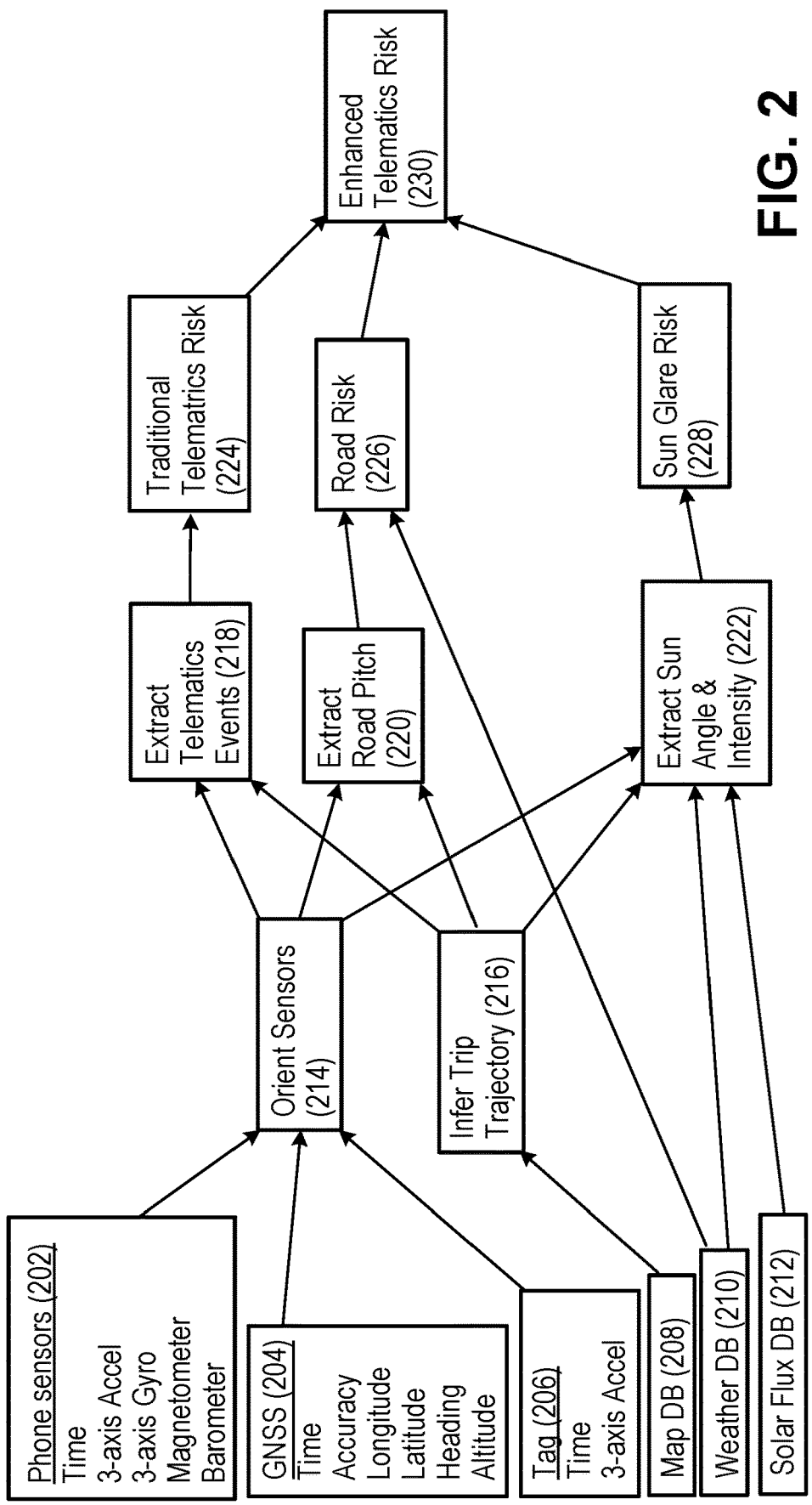

As represented in FIG. 2, road pitch and sun glare risk factors can be considered to share common characteristics and effects. Each of them can be considered a risk factor on its own. For example, a sun glare risk factor can be determined based on the total time the driver is exposed to sun glare having a value or score that exceeds a particular threshold, such as a sun glare risk score (SG) above 0.5, as described below. As another example, a sun glare risk factor can be determined when the driver is exposed to sun glare (e.g., having a particular value or score, for a particular amount of time, or in general) while approaching or driving through a pedestrian crossing, with the location of the pedestrian crossing determined from a map database.

Road pitch and sun glare risk factors also can be determined as supplements to other risk factors derived from traditional telematics events. For example, driving during icy conditions is dangerous; and driving on a segment of a road having a road pitch greater than 5 degrees or less than −5 degrees during icy conditions is extremely dangerous, to the extent that the combination can be viewed as a different kind of driving risk. Similarly harsh braking combined with road pitch greater than 5 degrees or less than −5 degrees can be extremely dangerous. Also extremely dangerous is a driving risk defined by speeding combined with solar glare exceeding a particular value or score or lasting more than, for example, 0.5 minutes, which can mean the driver may be unable to see far enough ahead to brake in time.

As shown in FIG. 2, the applications running on the mobile devices, or an application running on the server, or a cooperative combination of the two of them, are configured to process the mobile telematics data (and other relevant data) to detect, infer, interpret, or otherwise derive one or more risk factors (such as sun glare angle and intensity 222, road pitch 220, other environmental factors, other factors associated with the attitude of a vehicle with respect to a reference point, and other risk factors) from the mobile telematics data generated by the sensors 202, 204, and 206 (which may correspond to the sensors 48, 50 of the mobile devices 38, 40, sensors of the tag devices, or other sensors at the vehicles 34, 36, or combinations of them). One or more of the risk factors may then be interpreted or otherwise analyzed to detect, infer, or otherwise generate information about the existence or severity of one or more driving risks such as a road risk 226 or a sun glare risk 228, or a traditional telematics risk 224 (based on extracted telematics events 218). In generating driving risks and scores or measures of driving risks, other risk factors may also be taken into account. Other risk factors could include or relate to historical driving information about the driver or other drivers, other contextual information about the driving such as pitch or other attitude information, and driver behavior risks.

In some cases, the traditional telematics risk, the sun glare risk, or the road risk, or combinations of them can be reported directly to insurance carriers or drivers or other parties. In some instances, enhanced telematics risks 230 can be derived by analysis and aggregation of traditional telematics risks, road risks, or sun glare risks, for example, and then the enhanced telematics risks 230 can be reported to the insurance carriers or drivers or other parties. In addition to using road pitch data 220, the process that estimates road risk to 226 can also use information from a weather database 210.

The telematics events 218 used to estimate traditional telematics risks 224 can be extracted from oriented sensor data 214 and inferred trip trajectory data 216, among other things. Road pitch data 220 can be extracted based on a combination of oriented sensor data 214, inferred trip trajectories 216, and other sources. Sun angle and intensity data 222 can be extracted based on a combination of oriented sensor data 214, inferred trip trajectory data 216, weather information from the weather database 210, and solar flux information from a solar flux database 212. Trip trajectories 216 can be inferred from data obtained from a map database 208.

Among other sources, the mobile telematics data can be generated by and received from one or more sensors 202 in a smart phone or other mobile device, one or more tags 206, and one or more Global Navigation Satellite System (GNSS) receivers located, for example, in one or more mobile devices or tags. GNSS can include any global satellite positioning system such as the United States' Global Positioning System (GPS), Russia's Global Navigation Satellite System (GLONASS), Europe's Global Navigation Satellite System (Galileo), China's BeiDou Navigation Satellite System (BDS), and India's Indian Regional Navigation Satellite System (IRNSS), among others. Examples of the types of data made available from such sensors are listed on FIG. 2.

Figure 3:
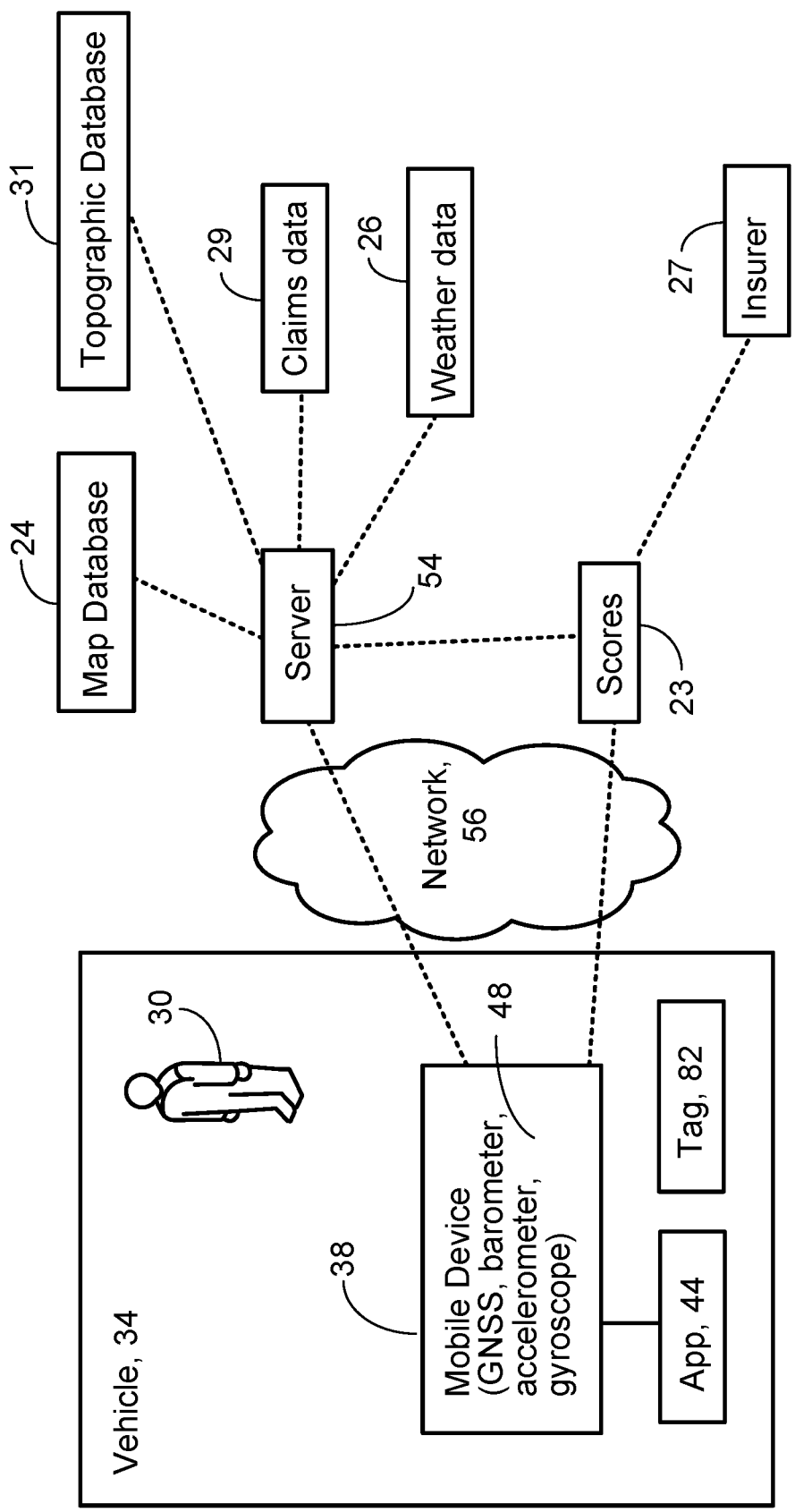

As shown in FIG. 3, in some implementations, the app 44 running on the mobile device 38 uses the mobile device to upload mobile telematics data acquired from the sensors 48 and, in some cases, the tag 52 over the cellular network 56 (or a wireless network or any other appropriate network) to the server 54. The application running on the server processes the mobile telematics data together with map data from a map database 24, weather data 26, topographic information from a topographic database 31, and other kinds of data to identify or evaluate the significance of one or more driving risk factors based on the angle and intensity of sun glare experienced by the driver. The server also can determine or store a degree of driving risk or driving scores 23 based on the values of the risk factors and other risk factors and in some cases other useful information. In performing its work, the application running on the server can take account of claims data 29 associated with drivers or with parts of the road network or with the weather or with other factors.

The mobile telematics data can be collected repeatedly at the smart phone and tag at successive moments or over a period of time or during a trip. The server in turn can determine successive or aggregate values or scores of the risk factor or factors and determine a degree of driving risk for successive times or trips for the given driver. Such mobile telematics data also can be collected for periods of driving time or trips of multiple drivers using multiple smart phones and reported to the server. Then the server can process, analyze, aggregate, or summarize the mobile telematics data, the values or scores of the risk factors, and the degrees or scores of driving risk that are being experienced over time and across populations of drivers.

Benefits and Applications

The mobile telematics data, values or scores of the risk factors, and degrees or scores of driving risks can have a range of different uses for a variety of different parties. For example, such information can be provided to one or more insurance carriers 27 and used for underwriting or other purposes or shared with one or more drivers to inform each of them how much (e.g., the degree) of a given risk factor (such as sun glare) he or she experiences, how often, on which trips, on which routes, during which times, in which seasons, and at which locations, and combinations of any of those items of information. In addition, the values or scores of the risk factors, and the degrees or scores of driving risks can be collected by a host of the technology or by an insurer across multiple drivers, multiple geographies, multiple trip characteristics, or multiple weather conditions, and then summarized, and provided to one or more insurance carriers.

As discussed later, another advantage and application of the technology that we describe here is to provide drivers with information about alternate routes or departure times for future trips that account for and minimize driving risk from one or more risk factors.

In the context of usage-based insurance, an insurance carrier could directly reward a driver for driving more safely by traveling on routes or during times of reduced sun glare (e.g., "Take Route #2 instead of Route #1 and this month's insurance premium will be reduced by one dollar.") or reduced road icing.

Although we discuss two particular examples of risk factors—sun glare and road pitch—the techniques that we describe here are applicable to a range of other risk factors. With respect to both sun glare risk factors and road pitch risks factors, for example, the attitude (pitch, roll, or yaw) of the vehicle relative to an external reference point comes into play. In the case of sun glare, the attitude of the vehicle relative to the location of the sun in the sky as the vehicle is driven along a route at a particular time of day in a particular season affects the existence or degree of the sun glare risk factor. In the case of road pitch, the attitude of the vehicle relative to the center of the earth affects the road pitch risk factor.

Other risk factors that involve the attitude of a vehicle relative to an external point of reference may also benefit from the technology described here. For example, an amount of time spent in reverse (backing up), or a number of reverse driving events could be considered risk factors. As another example, the technology described here can determine a moon glare risk factor or a moonlight risk factor, or both. In general, the attitude of the vehicle relative to the location of the moon in the sky as the vehicle is driven along a route at a particular time on a particular day affects the existence or degree of moon glare or moonlight experienced by a driver. For example, in the case of moon glare, if there is a partial moon or a full moon, and if the attitude of the vehicle is such that the driver is facing the moon, then the driver may experience significant moon glare. A study of the dangers associated with moon glare can be found in Redelmeier, D. A., and Shafir, E, "The full moon and motorcycle related mortality: population based double control study," BMJ, j 5367 (2017). On the other hand, if there is a new moon, or if the attitude of the vehicle is such that the driver would not be facing the moon, then the driver may experience little or no moon glare. The moon may also provide beneficial illumination at the vehicle, with the most advantageous phase of the moon being full, and the most advantageous position of the moon being at an azimuth opposite to that of the driver's heading (e.g., because the light reflecting off of pedestrians, bicyclists, road signs, and other features would be most visible to the driver in this scenario). Accordingly, the techniques described here can be used to process mobile telematics data along with other data, such as lunar calendar data, to identify a level of moon glare or beneficial moonlight, or both, experienced by a driver of a vehicle. This data may then be used to determine a moon glare risk factor or moonlight risk factor, or both, in which a high moon glare risk corresponds to a high level of moon glare experienced by a driver, and a high moonlight risk corresponds to a low level of beneficial moonlight experienced by a driver. In some implementations, the moon glare and moonlight data can supplement the determination of other risk factors or be used in other applications described here.

Sun Glare Risk Factor

The technology that we describe here can be used, for example, to detect, analyze, score, and report sun glare risk factors and related evaluations and scores of sun-glare-related driving risks.

In the case of a sun glare risk factor, computations performed by the app in the mobile device or the application at the server or both could take account of and include the following elements and processes.

Figure 4:
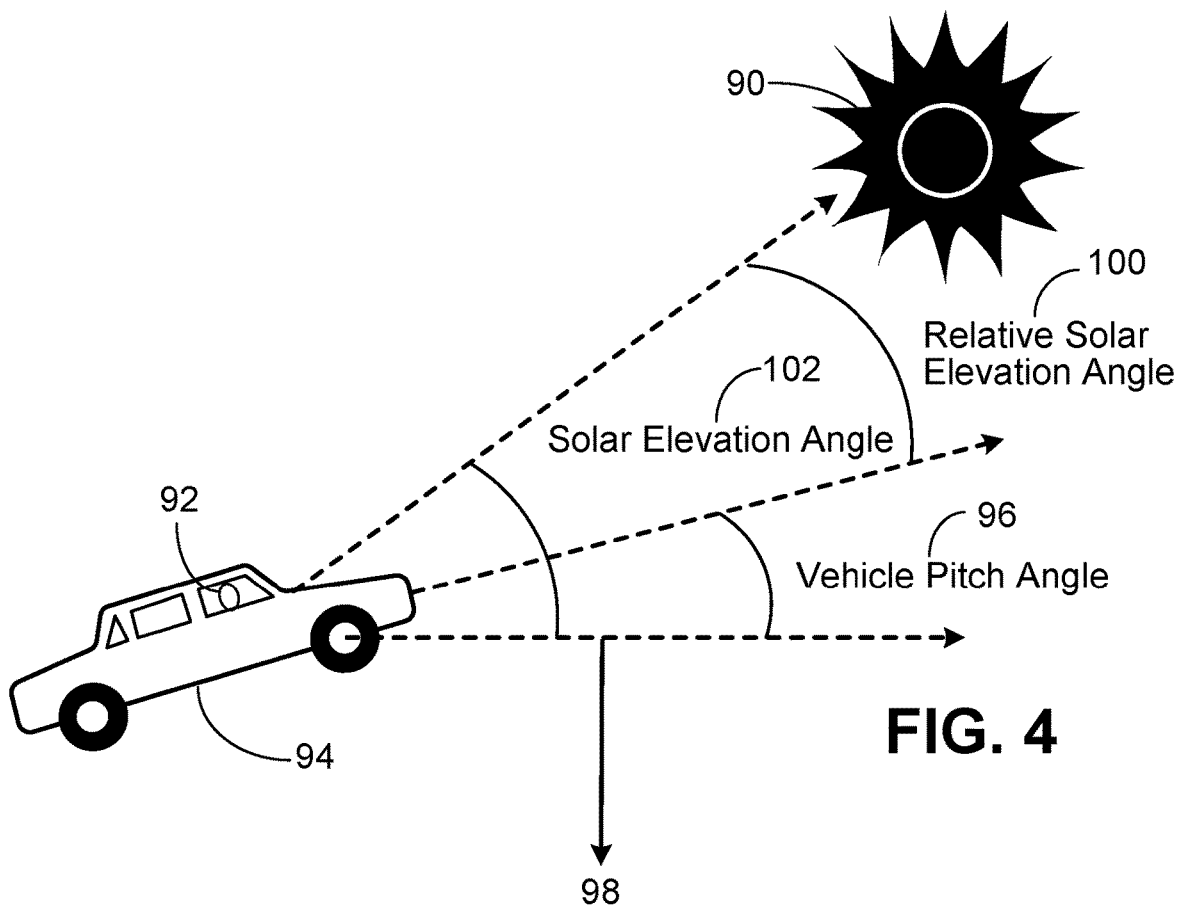
FIGS. 4 and 5 are schematic illustrations of vehicle attitude and solar elevation.

1. As shown in FIG. 4, for example, the software processes can determine how the sun 90 appears to or will appear to a driver 92, for example, the location of the sun in the sky relative to the vehicle 94, the attitude of the vehicle, the weather conditions, and the configuration of the windshield and other parts of the vehicle and combinations of these kinds of data. This data can suggest that a sun glare risk factor may exist and the severity of the sun glare risk factor. For this purpose, the technology can determine and describe the location of the sun 90 relative to the vehicle 94 and the attitude of the vehicle 94 relative to a fixed point of reference such as the center of the earth.

2. The pitch 96 of the car relative to a direction 98 toward the center of the earth is determined.

3. Known information about the solar elevation 102 is used to compute the relative solar elevation 100 between the vehicle at the determined pitch and the sun. The solar elevation is computed as follows. The location in longitude and latitude is estimated by combining a set of GNSS measurements with location data from a map database, as described in U.S. Pat. No. 8,457,880, titled "Telematics using personal mobile devices," which is incorporated here by reference in its entirety. A time stamp can also be derived from the GNSS for each measurement. The vehicle's altitude can be estimated by GNSS measurement, corrected by barometric pressure estimate, as described in the road pitch section of this document. The angle of the sun relative to the horizon can then be computed by use of a solar ephemeris. For purposes of later discussion, let rawRSE="relative solar elevation" in radians.

Figure 5:
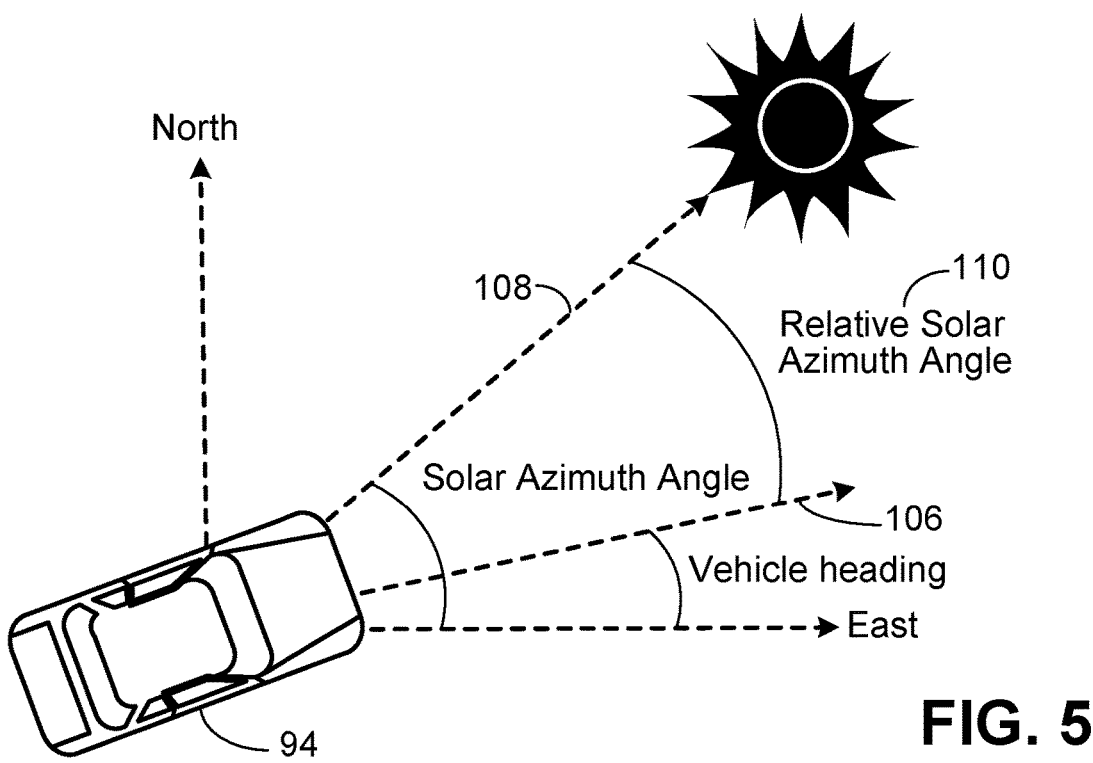

4. As shown in FIG. 5, the heading (e.g., the direction of travel 106 or conceptually the yaw) of the vehicle relative to the known direction of the sun 108 is determined, and the known solar azimuth is used to compute the relative azimuthal angle 110 between the vehicle direction and the direction of the sun. The heading estimates are provided by the GNSS chipset, the magnetometer, and the map-matched road segment. These features are combined into a single estimate using techniques analogous and essentially identical to those described for FIG. 8 with respect to pitch, with magnetometer data replacing barometer data. Data from a combination of one or more of the sensors may be absent, in which case smoothing can be performed on the remaining sensors. In some implementations, if signals from all sensors are absent, no indication of risk is made. For purposes of later discussion, let rawRSA="relative solar azimuth" in radians.

Figure 6:
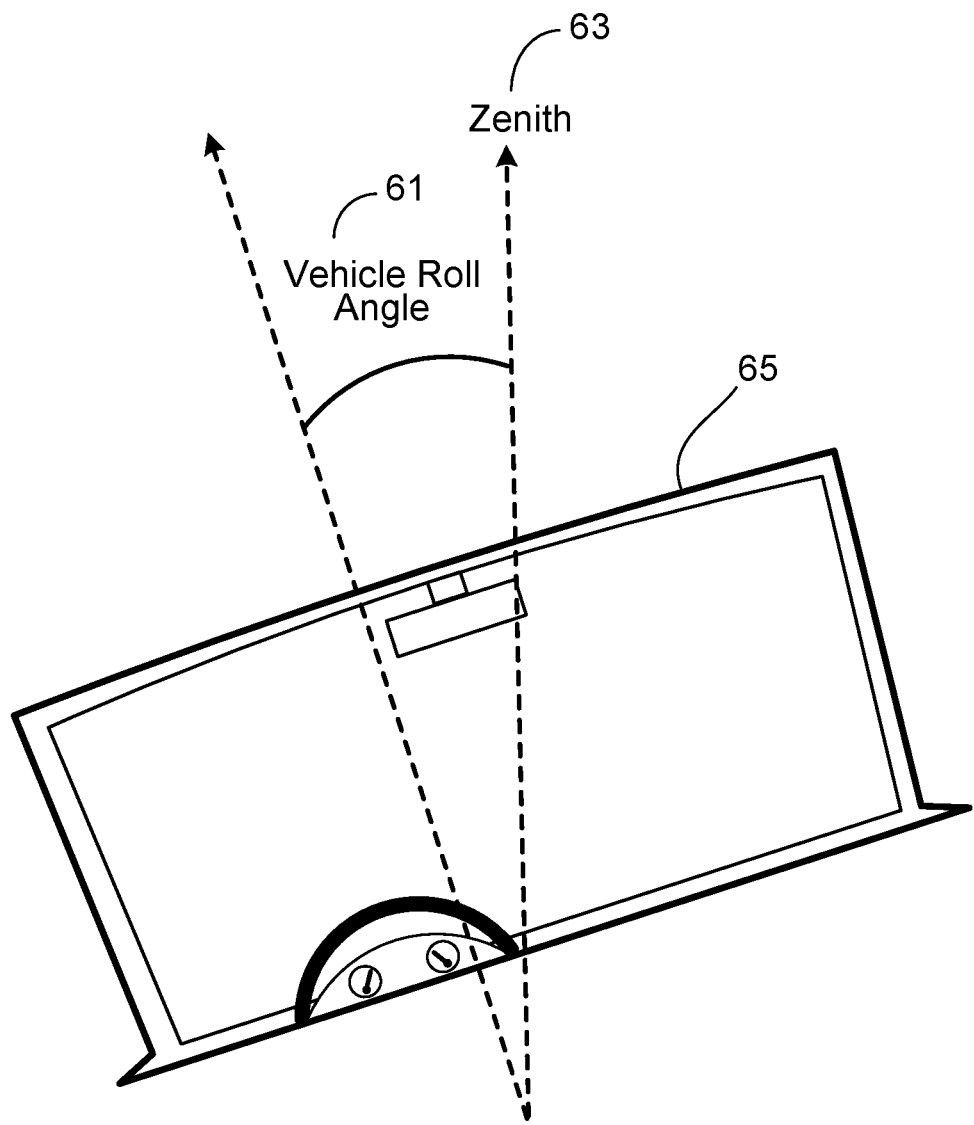
FIG. 6 is a schematic diagram of a windshield and a roll angle of a vehicle.

5. As shown in FIG. 6, if a device is affixed to the reference frame of the car, then the roll of the vehicle can be computed, as in described in U.S. Pat. No. 10,440,451, incorporated here by reference in its entirety. Given a roll 61 of angle theta in radians relative to the zenith 63, where theta=0 indicates that the vehicle is perfectly level (no roll or pitch), we correct for the angle of the windshield 65 as follows:

$$RSA = \text{raw}RSA * \cos(\text{theta}) + \text{raw}RSE * \sin(\text{theta})$$

$$RSE = -\text{raw}RSA * \sin(\text{theta}) + \text{raw}RSE * \cos(\text{theta})$$

Because most road surfaces are nearly level in the direction transverse to normal traffic flow, the vehicle roll angle 61 can be assumed to equal to zero or otherwise ignored in some implementations.

6. Referencing a database of solar flux, the expected solar flux at the location of the vehicle during the particular time of day and year of the drive (and given a clear atmosphere) can be determined, such as described by U.S. Patent Publication No. 2019/0221023, incorporated here by reference in its entirety. This estimate accounts for occlusions such as buildings or hills that might block the sun, based on information available from topographic maps and building surveys. Let SF be the solar flux, as a floating-point number between 0 and 1.

7. Referencing a database of weather information, visibility at the longitude and latitude of the vehicle can be determined given the weather conditions at the time of the drive (with longitude, latitude and time estimated as in Step 3). Let WC be the weather clarity, as a floating-point number between 0 and 1.

8. Compute a sun glare risk score, SG, from the perspective of the eyes of the driver. The determination may be made as follows:

$$\text{If } |RSA| > 0.3 \text{ or } |RSE| > 0.15, SG = 0 \qquad 1.$$

$$\text{Else: } SG = ([1 - |RSA|/0.3] * [1 - |RSE|/0.15] * SF * WC)^{0.25} \qquad 2.$$

For case 1, these RSA and RSA values are approximately the levels above which solar glare would not be considered an issue in most situations. For case 2, solar glare generally worsens as the azimuth angle (RSA) is centered on the driver, and as the elevation (RSE) approaches the horizon, modulated by the effects of the solar flux including occlusions (SF) and the weather (WC).

9. As discussed earlier, for the determinations explained in items 1 through 6 (time, position, attitude and heading), data can be collected on a smart phone or other mobile device (or the tag, or both) and transmitted (then or later) to a server where items 7 and 8 can be determined as described in U.S. Pat. No. 9,228,836, incorporated here by reference in its entirety. In some implementations, the items in 7 and 8 are determined by the mobile device (or tag) itself.

Figure 7:
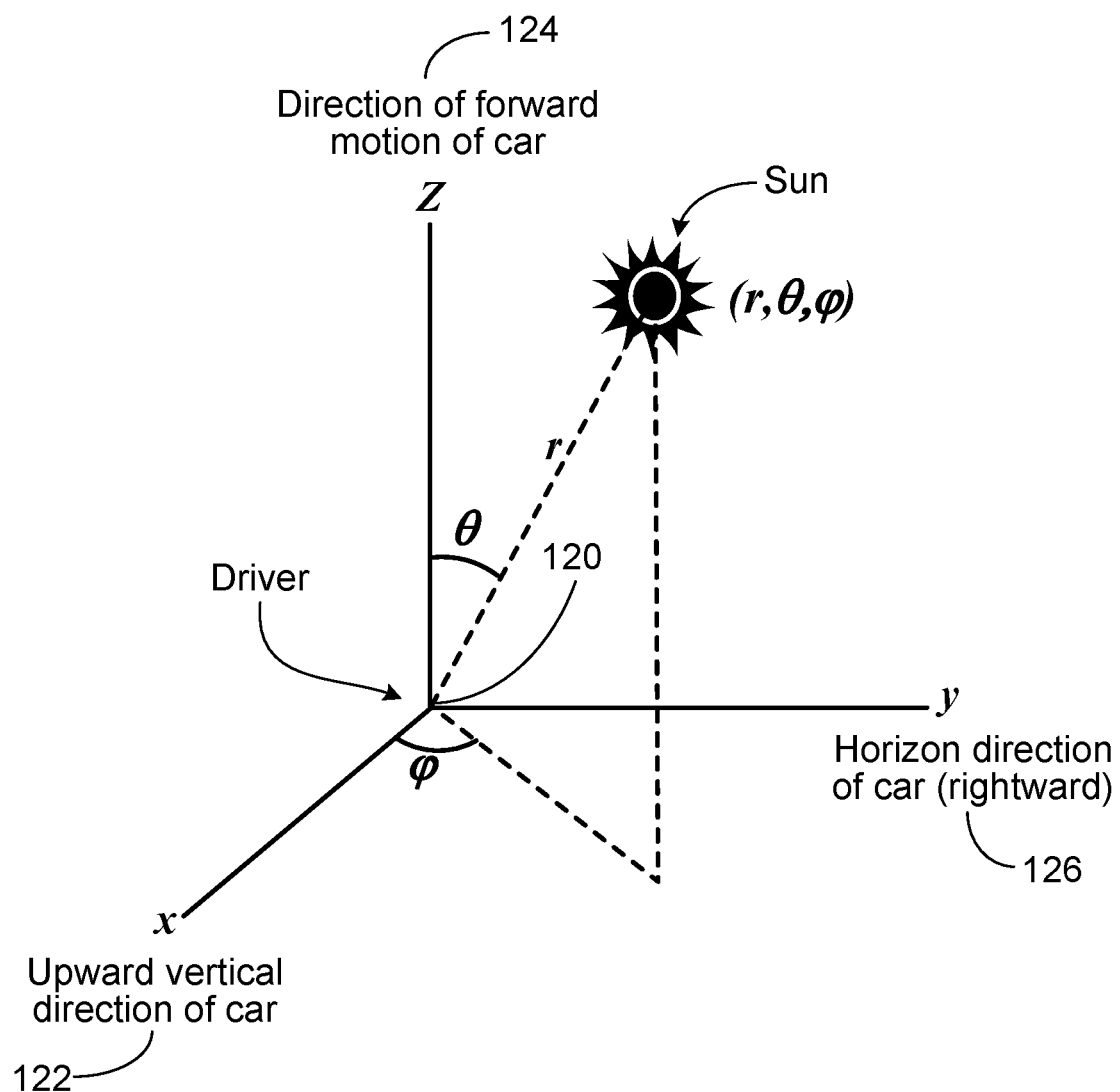
FIG. 7 is a schematic diagram of a driver reference frame.

10. As shown in FIG. 7, the mobile telematics data collected by the app on the mobile device can include, for example, a time stamp, a location (e.g., longitude and latitude, based on GNSS or network location, or both of them), a vehicle heading 120 (e.g., 37.243 degrees, where 0.0 degrees is true north), and a vehicle altitude 122, 124, 126 (based on data from GNSS, a barometer, or another device, or a combination of), as described in U.S. Pat. No. 9,228,836, incorporated here by reference in its entirety.

11. One function of the app or the application or both is to interpolate and time align the data streams referred to above.

The application running on the server or the app running on the mobile device or both have access to the following information, which is also used in processing risk factors and driving risks:

12. A map of the road network.

13. Weather information for the location and time of the trip. The server uses heading, location, and altitude information to estimate the position, pitch or other attitude, and heading of the car. The server also matches the vehicle's path to the road network map, which typically improves the location and altitude estimates, as described in U.S. Pat. No. 9,228,836, incorporated here by reference in its entirety.

Although a particular sequence of computational activities 1 through 13 have been described above, a variety of other sequences of such activities (and other activities) can also be applied. For example, split of activities between the mobile device and the server can be determined in any way that is suitable, efficient, or effective, such as sending the raw data streams from the mobile device to the server and performing calculations and other activities at the server rather than at the mobile device.

Based on the available data from the activities 1 through 13, the server or the mobile device or both can provide a series of telematics motion data samples, each including a time, position, heading, and attitude. Given the time stamp and the vehicle's latitude, the server can compute the solar elevation and solar azimuth. The server can then compute the relative solar elevation, relative solar azimuth, and roll.

The computation of SG can be improved if, for instance, the vehicle's VIN is available. In that case, the make, model and year can be determined. This information can be used to determine the dimensions and shape of the windshield by looking it up in a database of vehicle specifications. The server can determine if the sun's rays would directly strike the eyes of the driver given the size and shape of the windshield. If so, the server can use the local weather to modify the anticipated intensity of the sun glare. For example, if the weather is cloudy, the effective glare determined by the server is reduced.

Alternate Route Planning

Because drivers frequently travel between the same locations at approximately the same times of the day, it is possible to predict, for example, the timing and route of a driver's likely trip on a future day. Based on the prediction and on information about the day of the year and the weather, the technology that we describe can be used to suggest one or more alternate routes or times of travel for which the driver may experience less sun glare. Predictions of future trips can also be used to suggest one or more alternate routes or time to travel with respect to road pitch or other risk factors.

Sun glare accidents are more likely to occur on certain types of roads. Hagita et al. suggest roads with pedestrians are particularly dangerous. The technology that we describe here can suggest one or more alternate routes or alternative times for travel during which the driver is likely to experience less sun glare associated with more dangerous road situations, such as the presence of pedestrians.

For alternate route planning purposes, the server can first collect, from the mobile device or the tag, driving data on a given user for a sufficient period of time, e.g., two weeks. Thereafter, the server can determine if the driver tends to travel between approximately the same pair of points at approximately the same times of day (e.g., morning or evening commutes) or can predict other behavior of the driver for future trips that is relevant to road pitch or other risk factors. In some implementations, this information can be provided by a user (e.g., by the user specifying a location of their home, work, or other destination).

For any given route and time (e.g., tomorrow's morning commute), the server can determine the extent of sun glare likely to be experienced by the driver and compute an aggregate sun glare score (e.g., the number of seconds for which the polar angle is less than some threshold $\mu 0$). Given the observed range of travel times from prior days, the server can compute for which departure time the driver would experience the least sun glare and suggest that time of departure to the driver. The suggested departure time will change with the seasons, e.g., with the specific day during the year. This information could be communicated to the driver either through the app or through a web portal, for example.

Sometimes there are multiple reasonable routes between pairs of points that may encompass different headings or other aspects of vehicle attitude. In that case, it is possible to evaluate several alternate routes based on their respective sun glare scores, while imposing reasonable constraints on travel times or distances or both. A route having a lower sun glare score and approximately the same time and distance to travel as another route can be preferred by the server in its suggestions to the driver.

In the case of usage-based insurance, the driver pays a direct cost for more dangerous driving in the premium. If the server offers alternate departure times or routes to avoid sun glare, the server could display to the driver through the app for a web browser the premium cost savings if the driver takes the alternate route.

For actuarial purposes, the mobile telematics data, the corresponding risk factors, and the estimated driving risks can be reported to an insurance carrier, for example, in a number of forms, such as the actual data samples, or the number of seconds that the polar angle is less than a threshold $\mu 0$, among others.

Other implementations of the sun glare technology are also possible. For example, as mentioned earlier, a sensor tag distinct from the mobile device can produce an improved estimate of heading, pitch, and roll. In some cases, the effect of pitch can be ignored in the sun glare processing by assuming that the vehicle is traveling on a level surface (i.e., perpendicular to the zenith). In some instances, the effect of roll or yaw (heading) of the vehicle can be ignored in favor of an assumption that the car is always fully upright and heading in the direction from which the sun's rays are approaching. In some instances, map matching (and maps) can be ignored in favor of using the raw heading or pitch information or both.

Although the mobile telematics data streams typically need to be interpolated, they do not necessarily need to be time aligned. Sun glare is likely to be persistently present or absent when considered over some time scale, enabling the mobile telematics data to be subsampled without changing the sun glare score substantially.

In some examples, the results of the analysis (e.g., the driving risk factors, the driving risks, the sun glare scores, or alternate routes or times) can be presented in multiple forms (in an app, on a web page, or in printed form, or combinations of them).

Sometimes the effect of weather can be ignored and the technology can refrain from using any current weather information, or seasonal estimates for that location and time of year.

Instead of using a smart phone or other mobile device, the mobile telematics data can be gathered by one or more other on-vehicle data-gathering platform, such as an OBD II device or other special purpose device ("black box").

In some cases, the technology need not correct for local or global geography, map matching or weather, and only latitude and longitude (or an approximation of latitude or longitude, or both) need be used.

Other usage-based evaluations of risk factors can be combined with sun glare (e.g., sun glare scores) to produce more accurate estimates of driving risk. For example, the penalty associated with dangerous speeding might be greater if it occurs during a period of sun glare.

Other driving risk factors can be considered in determining a sun glare score or other evaluation of driving risks. A distant mountain range may reduce sun glare by blocking the sun. This large scale geographical effect can be incorporated in the estimate of sun glare by, for instance, projecting the solar azimuth direction from the vehicle along the earth and checking if any locations along the path have altitude sufficiently high to block the sun.

Similarly, a nearby building may reduce sun glare by blocking the sun. If a map provides exact or estimated building height and building massing information in an area near the vehicle, the resulting sun-blocking effect can be identified and the sun glare estimate improved. The presence, approximate height, locations, and other information about buildings in an area near the vehicle can also be deduced by mobile telematics data that includes raw GNSS measurements (such as pseudorange measurements to individual GNSS satellites) by, for example, noting which GNSS satellites would be expected to be observable at the vehicle given an unobstructed view of the sky using the GNSS constellation ephemeris, and determining whether such satellites are visible to the GNSS receiver in the vehicle. In some implementations, GNSS measurements taken at different vehicles on the same or similar route within a threshold period of time could be combined to increase confidence in the detection of buildings.

The accuracy of the glare score can be improved using an estimate of the geometry of the windshield and sun visor (which is determined by the make and model of the vehicle) along with the driver's seated height. If either of these pieces of information are available or can be estimated, the sun glare score can modified to provide a more accurate representation of the sun glare experienced by the driver.

Additional information related to the application of this technology to sun glare can be found in U.S. Pat. No. 9,228,836, titled "Inference of vehicular trajectory characteristics with personal mobile devices," and U.S. Pat. No. 10,440,451, titled "System and method for obtaining vehicle telematics data," which discuss sensor tags, and both of which are incorporated here by reference in their entirety.

Road Pitch Risk Factor

In some examples, the technology that we describe here can address a risk factor associated with a degree of pitch that a vehicle experiences from time to time, during a period of time, on a particular route, or during a trip. We use "road pitch" and "vehicle pitch" interchangeably; when the vehicle is aligned with a road segment, as is typically the case, the two are identical. Road pitch is associated with one aspect of the attitude of the vehicle.

In some cases, the sensor data sampled and recorded by the mobile device or the tag provide mobile telematics data sufficient to indicate the pitch of the smart phone or other mobile device (and by implication the pitch of the vehicle). The smart phone can occasionally (or in some cases frequently) upload the mobile telematics data through a wireless network to a server. The server processes the data, either alone or in combination with other mobile telematics data measured at the same vehicle or a different vehicle, to provide a single estimate of road pitch at each data sampling time (e.g., one estimate per second). One or more road pitch risk factors can then be derived from the resulting road pitch data. The resulting road pitch risk factors can then be used by the server to assess driving risk by any of several methods.

For example, the periods of time spent traveling at a given road pitch (or at road pitch within a particular range of road pitches) can be aggregated and reported as a driving risk factor. The aggregate amounts of time spent traveling at respective road pitches can also be generated. The relationship of aggregate time periods spent versus road pitches can be a useful indicator of risk factors and corresponding driving risks to the extent that, for example, driving on a steep hill is inherently risky.

Also, for example, each road pitch estimate or combinations of road pitch estimates or aggregated road pitch estimates can be combined with other driving and environmental risk factors to improve joint risk assessment (e.g., driving risk associated with a combination of two or more respective risk factors). For example, traveling down a steep hill and traveling in freezing rain may each independently pose a significant driving risk. However, traveling downhill during a freezing rainstorm entails a substantially higher driving risk than either individual risk.

Among the advantages of the road pitch risk factor analysis using the technology that we describe here are more accurate assessment of driving risk, more accurate insurance premium pricing, better driver understanding of their driving risk, and the lack of any need for installation of special equipment by a professional mechanic.

With respect to using the pitch of the vehicle as a risk factor of driving risk, the app could collect and store the following information on the smart phone or other mobile device while the vehicle is being driven (depending on the availability of the data on a particular mobile device): phone clock time; 3-axis accelerometer value; location; latitude/longitude/altitude position; accuracy of position; speed, heading; 3-axis gyroscope value; barometer value; magnetometer value; and state value of the mobile device such as screen state (on/off, locked/unlocked), phone call state, and audio channel state. At the end of a trip, the data can be compressed at the mobile device and uploaded to the server.

The server then uses the uploaded data to compute the attitude of the phone relative to the vehicle using techniques such as those described in "Inference of vehicular trajectory characteristics with personal mobile devices," U.S. Pat. No. 9,228,836, incorporated here by reference in its entirety.

The vehicle's pitch and other aspects of its attitude can then be estimated in a variety of ways including the following.

Figure 9:
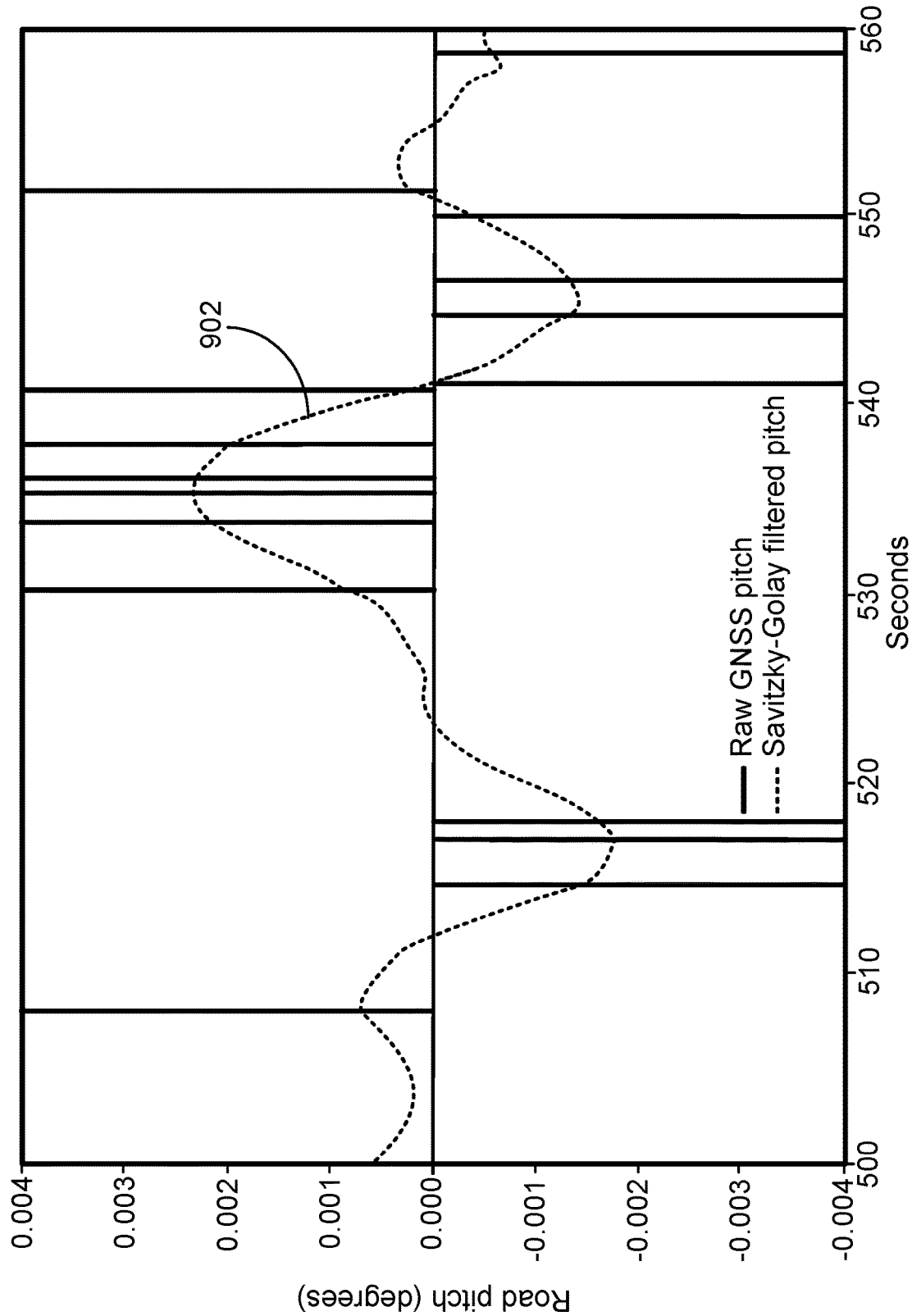

If GNSS data is available, such as speed SG and an altitude AG approximately once per second, the server can smooth the valid speed data and altitude data and detect physically implausible values. The server can then compute DG, the rate of change of GNSS altitude, either by taking finite differences of AG, or in the case of a Savitzky-Golay filter, by using an analytic solution. (We illustrate the benefit of using the Savitzky-Golay filter over a finite difference approach in FIG. 9 at (902).) The GNSS road pitch can then be determined as DG/SG.

If barometric information is available, the server can first convert from air pressure to altitude using the estimate:

(log(sea_level_pressure)−log(pressure))/pressure_constant where "pressure" is the observed air pressure; the "pressure_constant" is (EARTH_SURFACE_GRAVITATIONAL_CONSTANT*MOLAR_MASS_OF_DRY_AIR)/(UNIVERSAL_GAS_CONSTANT*SEA_LEVEL_STANDARD_TEMPERATURE)=([9.80665 m/s^2] *[0.0289644 kg/mol])/([8.31447 J/(mol*K)]*[288.15 K])=0.000118558; and "sea_level_pressure" is 1013.25 millibars. We can then use for example a Savitzky-Golay filter to smooth the elevation estimates and compute DB the rate of change of elevation. The barometric road pitch is then DB/SG.

The server can improve this estimate by re-estimating the sea level pressure at the time of measurement. The server performs this re-estimation by using the GNSS altitude measurements and the pressure measurements to solve for the sea level pressure at each sample. The server then computes a single mean estimate for sea level, replaces the standard 1013.25 millibar estimate with the improved estimate, and proceeds as in the previous paragraph. This correction allows the server to compensate for barometric fluctuations caused by the weather.

The server can use a road network to perform map matching. This procedure allows the server to map GNSS points onto a trajectory along road segments. Given a start and an end elevation for each road segment (start_EM and end_EM), and a length L, the server can compute a map match road pitch (end_EM−start_EM)/L. Note that GNSS speed is unnecessary.

The server can combine a map matched estimate of position with a secondary topographic database of altitude (such as the National Elevation Dataset (NED) or the 3-D Elevation Program (3DEP)). This data provides estimates of altitude on a finer geospatial scale than a road segment, so may capture local fluctuations in road pitch. In particular, the vehicle position is measured by GNSS, then map matched; the map matching improves the location of the GNSS positions; then the altitude is referenced from the topographic database instead of either the road geometry or the GNSS altitude. The altitude measurements are then smoothed, and a rate of change of altitude is computed.

Figure 8:
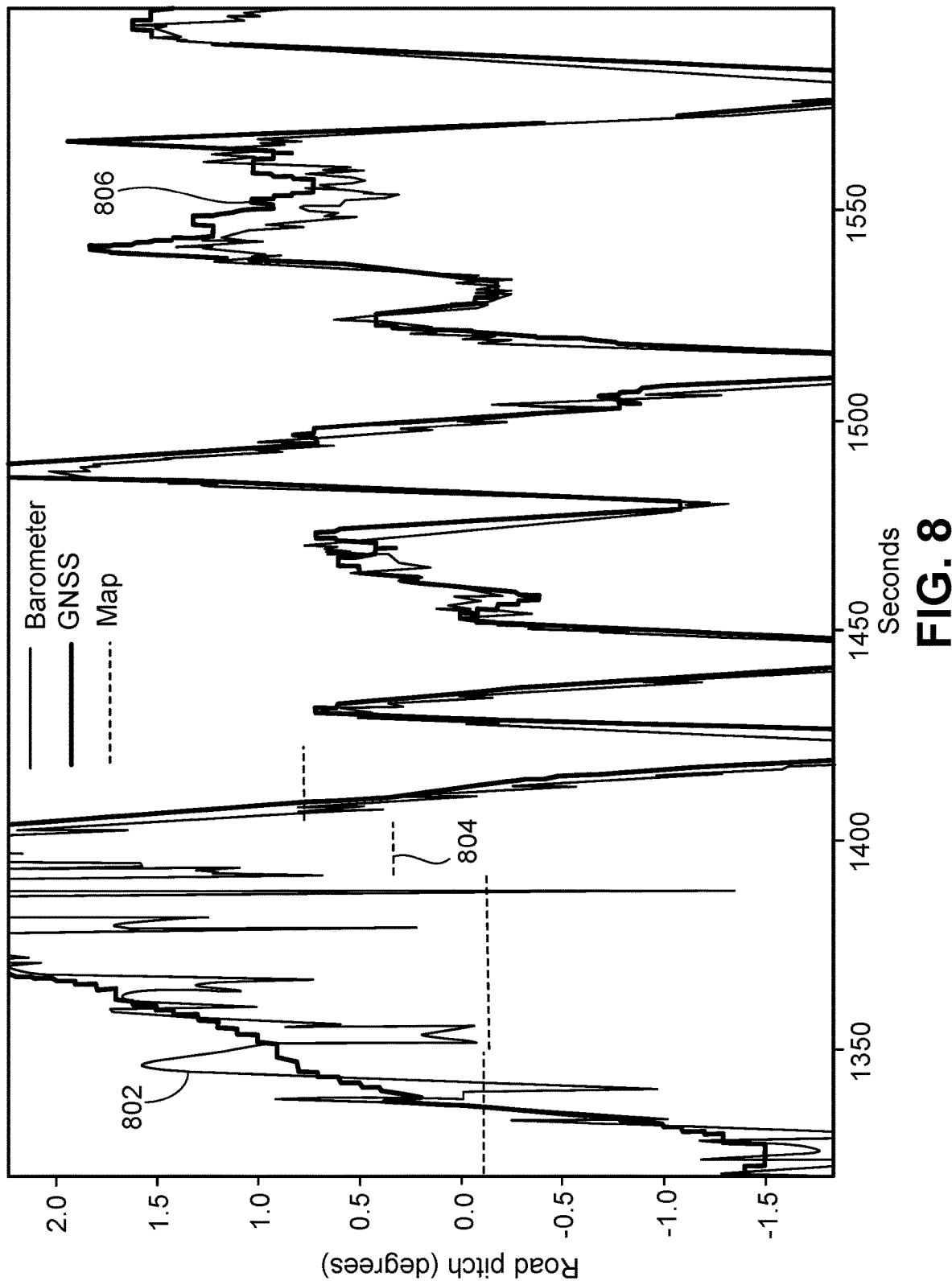
FIGS. 8 and 9 are road pitch versus time diagrams.

It is possible that these estimates are in error because of errors or complications in input data, as we illustrate in FIG. 8. For example, the GNSS data may claim to have high accuracy, but still be mistaken (806). Barometric data can show anomalous spikes if the driver slams the door to the vehicle (802). Pitch derived from road maps produces erroneous discontinuities in road pitch (804). These errors can be detected through several methods. First, if the data is physically implausible, the software may reject it. For example, graded highways in the United States typically have a maximum grade of 8 degrees; if the software observe a steeper grade, then the road pitch estimate is probably incorrect and the software can reject it. Second, if one estimate is inconsistent with the other estimates, we may reject it. For example, if the GNSS pitch estimate is 6 degrees, but the barometric, map matched and topographic estimates are around −3 degrees, then we may reject the GNSS estimate.

Additionally, a given driver may travel repeatedly over the same roads. Similarly, multiple drivers may travel over the same roads at the same or different times. This allows the database to collect multiple measurements from one or more devices of the same road during the same or different times in different conditions, such as different barometric conditions. This provides independent samples of certain nuisance variables and errors, such as sea level pressure and GNSS error. By averaging or otherwise combining data across multiple partially or completely independent estimates of the same road pitch, the software can produce extremely accurate estimates of road pitch at certain locations. It can also provide sufficient evidence to detect and correct elevation errors in the road network and topographic databases. For example, if the GNSS and barometric road pitch are inconsistent with the map matched road pitch on a single trip, the software can assume the map to be more accurate. However, if the software observes the same GNSS and barometric road pitch across 20 trips with differing sea level air pressure and GNSS satellite constellations, the software may conclude that the map is inaccurate.

Given a set of plausible road pitch estimates from the same or different vehicles, the software can fuse them into a single estimate by using a weighted sum of the estimates. The weights may be functions of the observations (e.g., if the reported GNSS accuracy is low for a given sample, then the weight of the GNSS estimate may also be reduced). The software can use the road pitch of frequently measured roads, as described in the previous paragraph, to select and validate the best weights.

Given a second-by-second estimate of road pitch, the software can now use it in a variety of ways to derive road pitch risk factors and corresponding evaluations of driving risk associated with driving safety for a driver.

Each risk factor (for vehicle pitch or sun glare, for example) can be evaluated at individual moments in time or for individual locations, or a combination of the two. In addition, each risk factor can be evaluated in combination with other risk factors (and combinations of them) such as the following speeding behavior risk factors: aggregate time (e.g., "the driver drove over the speed limit for 12.5 hours over the past 6 months"); aggregate mileage (e.g., "the driver drove over the speed limit for 117.5 miles over the past 6 months"); count of events (e.g., "the driver engaged in 35 distinct speeding events"); or histogram of events (e.g., "the driver engaged in 12 unsafe speeding events with a maximum speed 10-20 mph over the speed limit, and 7 unsafe speeding events 21-30 mph over the speed limit, etc.). A wide variety of risk factors can be evaluated alone or in combination and reported, for example, to the insurance carriers.

These measurements can be done per trip, or over a fixed period of time (such as a week or 6 months).

The road pitch risk factors to be considered can include one or combination of two or more of the following:

Driving on roads with high road pitch (as that may be intrinsically more dangerous than travel on a level surface).

High acceleration and velocity-change ("delta-v") events with road pitch. This includes unsafe forward acceleration, braking and cornering coupled with road pitch. For example, braking while traveling downhill may be more dangerous, as the tires are more likely to slip; braking while traveling uphill may be less dangerous for the complementary reason.

Unsafe speeding events with road pitch.

Distracted driving with road pitch. For example, texting while sharply cornering on a downhill slope may be particularly dangerous.

The risk factors to be considered along with road pitch factors may include each or a combination of two or more of a broader set of driving risk factors, including:

Weather factors. For example, driving downhill during a snowstorm may be more dangerous than time spent driving downhill without a snow storm.

Driver experience. For example, a new driver may be more dangerous than a more experienced driver.

Lighting conditions during driving. Driving at night, or driving into the glare of the sun, may also affect risk.

By using a large available set of mobile telematics data associated with individual trips and over multiple trips for a given driver or a population of drivers, a variety of scores for risk factors can be generated including one or a combination of two or more of the following:

Percentile score. Using historical population-wide data to compare a driver's scores with other drivers' scores and to determine a percentile (e.g., a driver is at the 93 percentile of safety). A driver also has historical claims data that can be factored into the score.

Estimated claims score. By regressing the scores against claims costs, an estimate of the likely future claims costs of the particular driver can be predicted.

Driver modification score. Ideally, a driver will learn about his or her own dangerous driving behavior and improve it. If a poor driver is presented with his percentile score, he or she may find it discouraging and stop engaging with a driver safety program. To reduce the chances of that, it is useful to modify the score to provide more encouragement. In particular, the minimum score can be elevated (e.g., the scores may range from 40 to 100 instead of 0 to 100). Additionally, the user-visible score scale can be set so that initial improvements in driving score are relatively simple and dramatic, to encourage improvement in poor drivers.

Among other things, the app on the mobile device can be configured to display the dangerous driving behavior and the driving scores to the driver.

Other Implementations

Other implementations of the pitch risk factor analysis are possible. For example, as mentioned earlier, a tag or other small device can be affixed to a stable spot on the car. (For example, the driver may install it on his windshield using double-sided tape.) The tag device can contain a three-axis accelerometer, a clock, a memory, a processor, and a Bluetooth transceiver for communicating with the phone. Such a device is described in U.S. Pat. No. 10,440,451, incorporated here by reference in its entirety.

The tag can provide an additional method of estimating road pitch. Because the device is affixed to the vehicle, the changes in the direction of gravity directly relate to the roll and pitch of the vehicle. In particular, the app can use the phone to orient the tag as described in U.S. Pat. No. 10,440,451, incorporated here by reference in its entirety. This orientation indicates which direction is "forward", "down" and "left" relative to the vehicle.

Once the tag has been oriented, the app can consider the observed direction of gravity, averaged over a small window of time, to produce a gravity vector V. Because the tag is oriented, V can be expressed in terms of the frame of reference of the vehicle. Let U be the gravity vector rescaled to unit length, i.e., $U=V/|V|$. Let F be the unit vector in the forward direction of the vehicle. Then the tag road pitch is arcsine(F·U) where · is the standard dot product between vectors.

Other implementations are also within the scope of the following claims.

What is claimed is:

1. An apparatus comprising
   at least one processor, and
   a tangible storage for instructions executable by the at least one processor to:
      retrieve, from a storage device, two or more streams of sensor data produced by one or more sensors at a vehicle;
      determine a first attitude of the vehicle at a location relative to a frame of reference based on a first stream of sensor data from the two or more streams of sensor data,
      determine a second attitude of the vehicle at the location relative to the frame of reference based on a second stream of the sensor data from the two or more streams of sensor data,
      generate combined attitude data representing a combined attitude of the vehicle at the location relative to the frame of reference by combining the first attitude and the second attitude,
      based on the combined attitude data, determine a solar elevation angle between the vehicle and the sun and a solar azimuth angle between the vehicle and the sun;
      access weather information for the location during a time of the driving of the vehicle;
      determine, based on the weather information, a visibility at the location during the time of the driving of the vehicle;
      determine, based on a combination of the solar elevation angle, the solar azimuth angle, and the visibility, sun glare experienced in the driving of the vehicle; and
      generate a score for the vehicle or a driver of the vehicle based on the determined sun glare experienced in the driving of the vehicle.

2. The apparatus of claim 1 in which the sun glare comprises a current sun glare.

3. The apparatus of claim 1 in which the sun glare comprises a future sun glare.

4. The apparatus of claim 1 in which the instructions are executable by the processor also to receive data representing a time of day or a day of the year.

5. The apparatus of claim 1 in which the combined attitude represents a current attitude of the vehicle.

6. The apparatus of claim 1 in which the combined attitude represents a future attitude of the vehicle.

7. The apparatus of claim 1 in which the combined attitude represents a roll or a pitch of the vehicle.

8. The apparatus of claim 1 in which the instructions are executable by the processor to predict a route to be taken by the vehicle.

9. The apparatus of claim 8 in which the instructions are executable by the processor to receive data representing prior routes taken by the vehicle.

10. The apparatus of claim 1 in which the instructions are executable by the processor to send the first attitude, the second attitude, the sun glare, or the score to a server.

11. The apparatus of claim 1 in which the processor is part of a mobile device.

12. The apparatus of claim 1 in which the processor is part of a server.

13. The apparatus of claim 1 in which the instructions are executable by the processor to receive data representing a location of the sun.

14. The apparatus of claim 1 in which the sun glare comprises a length of time during which the driver of the vehicle is subjected to sun glare.

15. The apparatus of claim 1 in which the instructions are executable by the processor to identify routes reducing the sun glare.

16. The apparatus of claim 1 in which the instructions are executable by the processor to identify times of departure reducing the sun glare.

17. The apparatus of claim 1 in which the instructions are executable by the processor to predict a timing and route of a likely future trip of the vehicle and to suggest one or more alternate routes or times of travel to reduce the sun glare.

18. The apparatus of claim 17 comprising displaying to a user an insurance premium cost savings associated with the one or more alternate routes of the times of travel.

19. The apparatus of claim 1 in which the instructions are executable by the processor to determine an effect of a configuration of a windshield of the vehicle on the sun glare.

20. The apparatus of claim 1 in which the instructions are executable by the processor to suggest one or more alternate routes or times of travel to reduce a risk factor associated with a dangerous road situation.

21. The apparatus of claim 20 in which the dangerous road situation comprises a presence of pedestrians.

22. The apparatus of claim 1 comprising reporting to an insurance carrier estimated driving risks associated with the determined sun glare.

* * * * *

UNITED STATES PATENT AND TRADEMARK OFFICE
CERTIFICATE OF CORRECTION

| | |
|---|---|
| PATENT NO. | : 11,995,724 B2 |
| APPLICATION NO. | : 16/835678 |
| DATED | : May 28, 2024 |
| INVENTOR(S) | : William Francis Bradley, Samuel Ross Madden and Gregory David Padowski |

It is certified that error appears in the above-identified patent and that said Letters Patent is hereby corrected as shown below:

On the Title Page

Column 2, (56), OTHER PUBLICATIONS: Please delete "Hagta" and insert therefore
-- Hagita --; and In the Claims Column 15, Line 52, Claim 1, before "sun" please insert -- a --.

Signed and Sealed this
Sixteenth Day of July, 2024

Katherine Kelly Vidal
*Director of the United States Patent and Trademark Office*